United States Patent
Nakano et al.

(10) Patent No.: US 7,495,041 B2
(45) Date of Patent: Feb. 24, 2009

(54) FINE PARTICLE DISPERSION, COATING SOLUTION FOR ACCEPTING LAYER FOR COLORING AGENT FOR INK-JET RECORDING SHEET, INK-JET RECORDING SHEET USING THE DISPERSION, AND METHOD FOR PRODUCING FINE PARTICLE DISPERSION

(75) Inventors: Ryoichi Nakano, Shizuoka-ken (JP); Shunsaku Higashi, Shizuoka-ken (JP); Takashi Kobayashi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 594 days.

(21) Appl. No.: 11/141,315

(22) Filed: Jun. 1, 2005

(65) Prior Publication Data

US 2007/0003714 A1    Jan. 4, 2007

Related U.S. Application Data

(62) Division of application No. 10/401,690, filed on Mar. 31, 2003, now Pat. No. 6,919,109.

(30) Foreign Application Priority Data

Apr. 1, 2002 (JP) ............... 2002-098662
Jul. 11, 2002 (JP) ............... 2002-202536

(51) Int. Cl.
*C09D 11/00* (2006.01)

(52) U.S. Cl. ...................... 523/160; 523/161
(58) Field of Classification Search .............. 523/160, 523/161
See application file for complete search history.

(56) References Cited

U.S. PATENT DOCUMENTS 6,165,606 A * 12/2000 Kasahara et al. ............ 428/323
6,492,005 B1   12/2002 Ohbayashi et al.
6,495,242 B1   12/2002 Tsuchiya et al.
6,685,769 B1    2/2004 Karl et al.

FOREIGN PATENT DOCUMENTS

| | | |
|---|---|---|
| EP | 0 928 821 A1 | 7/1999 |
| EP | 1 072 654 A2 | 1/2001 |
| JP | 7-17127 A | 1/1995 |
| JP | 10-119423 | 5/1998 |
| JP | 10-217601 | 8/1998 |
| JP | 2001-19421 A | 1/2001 |
| JP | 2001-149856 | 6/2001 |
| JP | 2001-207078 A | 7/2001 |
| JP | 2001-334742 A | 12/2001 |
| JP | 2001-341408 | 12/2001 |
| JP | 2002-316472 A | 10/2002 |

OTHER PUBLICATIONS

Japanese Abstract No. 11348409 dated Dec. 21, 1999.
Japanese Abstract No. 2000168228 dated Jun. 20, 2000.
Japanese Abstract No. 11078218 dated Mar. 23, 1999.
Japanese Abstract No. 11078217 dated Mar. 23, 1999.
Japanese Abstract No. 2000247021 dated Sep. 12, 2000.

* cited by examiner

*Primary Examiner*—Edward J Cain
(74) *Attorney, Agent, or Firm*—Sughrue Mion, PLLC

(57) ABSTRACT

The present invention provides an ink-jet recording sheet having a coloring agent accepting layer which contains a dispersion containing a cationic polymer with an average molecular weight of 60,000 or lower and having a sulfate ion concentration of 1.5% by mass or lower to the cationic polymer together with a water-soluble resin; an particle dispersion obtained by further granulating a pre-dispersion obtained by pre-dispersing a solution containing at least fine particles and a cationic polymer and the pre-dispersion and/or the particle dispersion is heated at room temperature for 5 hours or longer after pre-dispersion and/or after granulating; and a coating solution for coloring agent accepting layer obtained by adding a water-soluble resin to the particle dispersion.

8 Claims, No Drawings

FINE PARTICLE DISPERSION, COATING SOLUTION FOR ACCEPTING LAYER FOR COLORING AGENT FOR INK-JET RECORDING SHEET, INK-JET RECORDING SHEET USING THE DISPERSION, AND METHOD FOR PRODUCING FINE PARTICLE DISPERSION

CROSS REFERENCE TO RELATED APPLICATIONS

This is a divisional of application Ser. No. 10/401,690 filed Mar. 31, 2003, now U.S. Pat. No. 6,919,109 the disclosure of which is incorporated herein by reference.

BACKGROUND OF THE INVENTION

1. Field of the Invention

The present invention relates to a recording material suitable for inkjet recording using liquid ink such as water-based inks (a dye or a pigment is used as a coloring material), oil-based inks, or the like and solid inks which is a solid at a room temperature but are melted and liquefied for printing. The invention also relates to a fine particle dispersion to be used for the production of the recording material; and a method for producing the dispersion. More particularly, the invention relates to an ink-jet recording sheet which is highly glossy and having high printing density; a fine particle dispersion used for the production, and its production method. The invention also relates to a coating solution for coloring agent accepting layer for ink-jet recording sheet using the fine particle dispersion.

2. Description of the Related Art

In recent years, with the rapid advance of the information technology industries, various information processing systems have been developed. Recording methods and devices suitable for the latest information systems have also been developed and put into practical use.

Among these recording methods, an ink-jet recording method has been used widely for not only offices but also so-called home use. The advantages of the method is that the method can be applied to a variety of recording materials, the hardware (apparatus) is relatively economical, compact and quiet.

Further, along with recent advancements in resolution of ink-jet printers, it has been enabled to obtain so-called photo-like recorded matter with high image quality. Following such progress of the hardware (apparatuses), various types of ink-jet recording sheets have been developed.

The desired traits of the ink-jet recording sheets generally include (1) rapid drying (a high ink absorption rate); (2) a correct and uniform diameter of ink dots (no blurring); (3) an excellent graininess; (4) a high circularity of dots; (5) a high color density; (6) a high saturation (without dullness); (7) excellent water resistance, light resistance, and ozone resistance ;(8) high whiteness of recording sheets; (9) excellent shelf stability of the recording sheets [i.e., yellowing or blurring does not occur during long-term storage]; (10) resistance to deformation and good dimensional stability (sufficiently low curling); and (11) good hardware running.

Further, in order to obtain photograph-like high-quality prints, the photo glossy paper should possess traits such as good glossiness, surface smoothness and the photographic paper-like feel similar to that of silver salt photographs and the like.

For the purpose of improving the above-mentioned various characteristics, ink-jet recording in which coloring agent accepting layer has a porous structure have been developed and put to practical use in recent years. Such ink-jet recording sheets are excellent in ink accepting property (a rapid drying property) and highly glossy.

For example, in Japanese Patent Application Laid-Open (JP-A) Nos. 10-119423 and 10-217601, ink-jet recording sheets comprising an highly porous coloring agent accepting layer formed on a support, which accepting layer contains minute inorganic pigment particles and a water-soluble resin, are proposed.

These recording sheets, particularly ink-jet recording sheets having the coloring agent accepting layer which is composed of a porous structure and which contains silica as the fine particle of inorganic pigment, are considered to be excellent in ink absorbency and to have so high ink accepting capacity to form images with high resolution and high glossiness due to such composition.

However, the color density and glossy feel of the ink-jet recording sheet are yet insufficient compared to those of silver salt photograph.

Ordinally, ink-jet recording sheets are produced by applying a coating solution for a coloring agent accepting layer, to a support. The coating solution for a coloring agent accepting layer is produced by, pre-dispersing an aqueous solution containing fine particles and a cationic polymer, then further granulating the fine particles to obtain an particle dispersion, and adding a water-soluble resin to the dispersion. A cross-linking agent and the like can be optionally added to the dispersion. However, a coating solution for the coloring agent accepting layer produced in such a manner often becomes highly viscous and loses suitability to coating and suitability to filtration.

SUMMARY OF THE INVENTION

Accordingly, the purpose of the present invention is to provide an ink-jet recording sheet having a rapid drying property and giving thereon an image with high color density and glossy feel similar to silver salt photograph, and to provide an particle dispersion therefor. Another purpose of the invention is to provide an particle dispersion and its production method, wherein a coating solution for a coloring agent accepting layer, prepared by adding a water-soluble resin to the particle dispersion and used for production of ink-jet recording sheets does not become highly viscous. Still another purpose of the invention is to provide a coating solution for a coloring agent accepting layer, used for ink-jet recording sheets and having excellent suitability to coating and suitability to filtration.

The above-mentioned purposes of the invention can be achieved by providing the following particle dispersion, its production method, a coating solution for a coloring agent accepting layer of ink-jet recording sheets, and ink-jet recording sheets using the above-mentioned particle dispersion.

A first aspect, the invention is a dispersion (I) of fine particles, wherein an average diameter of the primary particles is 50 nm or less, and an average molecular weight of a cationic polymer contained in the dispersion is 60,000 or lower and concentration of sulfate ion is 1.5% by mass or lower based on the cationic polymer.

A second aspect of the invention is a dispersion according to the dispersion (I), wherein the cationic polymer in the dispersion (I) is polydiallyldialkyl cationic polymer.

A third aspect of the invention is a dispersion according to the dispersion (I), wherein the fine particles having an average primary particle diameter of 50 nm or less in the dispersion (I)

are composed of at least one selected from silica fine particles, colloidal silica, alumina fine particles, and pseudo-boehmite.

A fourth aspect of the invention is an ink-jet recording sheet having a coloring agent accepting layer which contains the dispersion (I) and a water-soluble resin.

A fifth aspect of the invention is an ink-jet recording sheet having a coloring agent accepting layer which further contains a cross-linking agent capable of cross-linking the water-soluble resin.

A sixth aspect of the invention is an ink-jet recording sheet having a coloring agent accepting layer which further contains boric acid or a boron compound as the cross-linking agent capable of cross-linking the water-soluble resin.

A seventh aspect of the invention is an ink-jet recording sheet having a coloring agent accepting layer which is a three-dimensional mesh structure layer with a porosity in a range from 50% to 80% and has a content ratio by mass [PB ratio (x/y)] of the fine particles (x) and the water-soluble resin (y) in the range from 1.5 to 10.

An eighth aspect of the invention is an ink-jet recording sheet having a coloring agent accepting layer which layer is obtained by cross-linking and curing a coating layer formed by applying a coating solution containing at least fine particles and a water-soluble resin, wherein the cross-linking and curing is carried out by adding a cross-linking agent to the coating solution and/or the following basic solution and supplying the basic solution of pH 8 or higher to the coating layer either (1) simultaneously with formation of the coating layer by applying the coating solution or (2) at a time during drying of the coating layer formed by applying the coating solution and before the coating layer shows falling drying rate.

An ninth aspect of the invention is an particle dispersion (II) obtained by further granulating a pre-dispersion obtained by pre-dispersing a solution containing at least fine particles and a cationic polymer, wherein the pre-dispersion and/or the particle dispersion is left at room temperature for 5 hours or more after pre-dispersion and/or granulating.

A tenth aspect of the invention is an particle dispersion (III) obtained by further granulating a pre-dispersion obtained by pre-dispersing a solution containing at least fine particles and the cationic polymer, wherein the pre-dispersion and/or the particle dispersion is heated, at a temperature higher than room temperature after pre-dispersion and/or granulating.

An eleventh aspect of the invention is a particle dispersion according to the dispersion (II), wherein an average diameter of the primary particle in the dispersion (II) is 50 nm or less.

A twelfth aspect of the invention is an particle dispersion according to the dispersion (III), wherein an average diameter of the primary particle in the dispersion (III) is 50 nm or less.

A thirteenth aspect of the invention is an particle dispersion according to the dispersion (II), wherein the fine particles in the dispersion (II) are composed of at least one selected from silica fine particles, colloidal silica, alumina fine particles, and pseudo-boehmite.

A fourteenth aspect of the invention is an particle dispersion according to the dispersion (III), wherein the fine particles in the dispersion (III) are composed of at least one selected from silica fine particles, colloidal silica, alumina fine particles, and pseudo-boehmite.

A fifteenth aspect of the invention is an particle dispersion according to the dispersion (II), wherein the cationic polymer in the dispersion (II) is a polydiallylamine derivative.

A sixteenth aspect of the invention is an particle dispersion according to the dispersion (III), wherein the cationic polymer in the dispersion (III) is a polydiallylamine derivative.

A seventeenth aspect of the invention is a coating solution for a coloring agent accepting layer, used for ink-jet recording sheets which is obtained by mixing a water-soluble resin with the particle dispersion (II).

An eighteenth aspect of the invention is a coating solution for a coloring agent accepting layer, used for ink-jet recording sheets which is obtained by mixing a water-soluble resin with the particle dispersion (III).

A nineteenth aspect of the invention is a coating solution for a coloring agent accepting layer, used for ink-jet recording sheets which is obtained by mixing a water-soluble resin with the particle dispersion (II) and further contains a cross-linking agent capable of cross-linking the water-soluble resin.

A twentieth aspect of the invention is a coating solution for a coloring agent accepting layer of ink-jet recording sheets which is obtained by mixing a water-soluble resin with the particle dispersion (III) and further contains a cross-linking agent capable of cross-linking the water-soluble resin.

A twenty first aspect of the invention is a coating solution for a coloring agent accepting layer of ink-jet recording sheets which is obtained by mixing a water-soluble resin with the particle dispersion (II) and further contains boric acid or a boron compounds as cross-linking agent capable of cross-linking the water-soluble resin.

A twenty second aspect of the invention is a coating solution for a coloring agent accepting layer of ink-jet recording sheets which is obtained by mixing a water-soluble resin with the particle dispersion (III) and further contains boric acid or a boron compounds as cross-linking agent capable of cross-linking the water-soluble resin.

A twenty third aspect of the invention is a method for producing particle dispersion including steps of preparing a pre-dispersion by pre-dispersing a solution containing at least fine particles and a cationic polymer and further granulating the pre-dispersion, wherein the pre-dispersion and/or the particle dispersion is left at room temperature for 5 hours or more after pre-dispersion and/or granulating.

A twenty fourth aspect of the invention is a method for producing particle dispersion including steps of producing a pre-dispersion by pre-dispersing a solution containing at least fine particles and a cationic polymer and further granulating the pre-dispersion, wherein the pre-dispersion and/or the particle dispersion is heated at a temperature higher than room temperature after pre-dispersion and/or granulating.

DESCRIPTION OF THE PREFERRED EMBODIMENTS

The ink-jet recording sheet according to the first embodiment of the present invention is characterized in that the sheet has a rapid drying property and an image with high printing density and high glossy feel can be obtained thereon, since the coloring agent accepting layer contains the dispersion of the invention, the water-soluble resin and if necessary, a cross-linking agent, a mordant, and the like.

The particle dispersion of the embodiment is a dispersion of fine particles, wherein an average diameter of primary particle is 50 nm or less and an average molecular weight of a cationic polymer contained in the dispersion is 60,000 or lower and the sulfate ion concentration is 1.5% by mass or lower based on the cationic polymer. A ink-jet recording sheet having a coloring agent accepting layer containing such a dispersion of fine particles with an average primary particle diameter of 50 nm or less and characterized in that the average molecular weight of a cationic polymer contained in the dispersion is 60,000 or lower and the sulfate ion concentration is 1.5% by mass or lower based on the cationic polymer, as well as a water-soluble resin has a rapid drying property and is capable of giving thereon an image with high color density and glossy feel similar to that of a silver salt photograph.

The particle dispersion of the second embodiment of the invention is a dispersion obtained by pre-dispersing a water-based solution containing at least fine particles and a cationic polymer and further granulating a pre-dispersion and the obtained dispersion is left at room temperature for 5 hours or more after pre-dispersion and/or after granulating. By leaving the dispersion for 5 hours or more after pre-dispersion and/or after granulating, in the case a water-soluble resin or the like is added to and mixed with the obtained particle dispersion, the mixed solution does not become highly viscous. Accordingly, a coating solution for a coloring agent accepting layer of ink-jet recording sheets obtained by adding the water-soluble resin or the like to the particle dispersion is excellent in suitability to coating and filtration.

Further, by heating the pre-dispersion after the pre-dispersion and/or particle dispersion after the granulating at a temperature higher than room temperature, an effect similar to that obtained by leaving the dispersion, can be obtained.

The term "pre-dispersion" of fine particles in this embodiment simply means the treatment to suspend particles in a water-based solution. Fine particles are suspended in a water-based solution by, for example, previously preparing a dispersion of fine particles and then adding the dispersion to a cationic polymer solution or adding a cationic polymer solution to the foregoing dispersion of the fine particles or simultaneously mixing both the solution and the dispersion or adding powder of the fine particles instead of the dispersion of the fine particles to the cationic polymer solution. And the "pre-dispersion" includes any dispersion free from a phenomenon that fine particles are floating on the dispersion or fine particles aggregate.

Further, the term "granulating" means to granulate a dispersion after pre-dispersion by a dispersing apparatus to the extent that the ratio of coarse particles with volume average particle diameter of 5 μm or more when measured by a particle size measuring apparatus (for example, LA910 manufactured by Horiba, Ltd.) is suppressed to 5% or lower.

The upper limit of the leaving time of the dispersion at room temperature after the pre-dispersion or after the granulating is not limited but properly about 72 hours in terms of the cost, the productivity, and the like. From the viewpoint, the leaving time of the dispersion is preferably in a range from 5 to 24 hours.

Further, a heating temperature higher than room temperature is sufficient for the foregoing heating treatment. And it is proper to keep the heating temperature at 80° C. or lower. Further, the duration time of the heating treatment depends on the heating temperature or the like and at a temperature near room temperature, the duration time similar to the above-mentioned time for leaving treatment of the dispersion, is required. For example, in the case the dispersion is heated to 50° C. after the pre-dispersion or after granulating, the duration time of the heating treatment is properly from 1 hour to 10 hours.

The foregoing treatment of leaving the dispersion and the heating treatment may be carried out in combination. For example, the pre-dispersion is left at room temperature after pre-dispersion and after the granulating the may be subjected to heating treatment and it is also possible to carry them out in reverse order.

Hereinafter, the invention will be described in details.

At first, a dispersion of the invention will be described.

Fine Particles

With respect to an ink-jet recording sheet of the invention, the coloring agent accepting layer of the sheet contains a dispersion of the invention and a water-soluble resin. The fine particles in the dispersion compose the constituent elements of the coloring agent accepting layer of the ink-jet recording sheet.

The coloring agent accepting layer of the ink-jet recording sheet is provided with a porous structure by containing the fine particles, and accordingly the ink absorbency can be improved. Particularly, in the case the content of the solids content of the fine particles in the coloring agent accepting layer exceeds 50% by mass, more preferably 60% by mass, a further excellent porous structure can be formed and an ink-jet recording sheet provided with a sufficient ink absorbency can be preferably obtained. Here, the solids content of the fine particles in the coloring agent accepting layer means a content calculated on the bases of the components other than water in the composition composing the coloring agent accepting layer.

The fine particles according to the invention may include organic fine particle and inorganic fine particles, however from a viewpoint of ink absorbency and image stability, inorganic fine particles are preferable.

Those preferable as the foregoing organic fine particles are polymer fine particles obtained by, for example, emulsion polymerization, micro-emulsion polymerization, soap-free polymerization, seed polymerization, dispersion polymerization, suspension polymerization and the like. And powder, latex, or emulsion of the polymer fine particles of polyethylene, polypropylene, polystyrene, polyacrylates, polyamides, silicon resin, phenol resin, natural polymer and the like is specifically preferable.

The foregoing inorganic fine particles include silica fine particles, colloidal silica, titanium dioxide, barium sulfate, calcium silicate, zeolites, kaolinite, halloysite, mica, talc, calcium carbonate, magnesium carbonate, calcium sulfate, pseudo-boehmite, zinc oxide, zinc hydroxide, alumina, aluminum silicate, calcium silicate, magnesium silicate, zirconium oxide, zirconium hydroxide, cerium oxide, lanthanum oxide, yttrium oxide and the like. Among them, from a viewpoint of the capability of forming an excellent porous structure, silica fine particles, colloidal silica, alumina fine particles or pseudo-boehmite is preferable.

Among them, in general, silica fine particles can be roughly classified to a wet process particle and a dry process particle (a gas-phase process particle) according to the production methods. With respect to the wet process, generally a process includes producing activated silica by an acid decomposition of a silicate and obtaining hydrated silica by permitting the activated silica to polymerize and aggregate/precipitate properly. On the other hand, the gas-phase process generally includes high temperature gas-phase hydrolysis of silicon halide (a flame hydrolysis process) and a process for obtaining silica anhydride by a process (arc process) in which silica sand and coke thermally reduced and evaporated by arc in an electric furnace and oxidizing the product by air. Here, the term "gas-phase process silica" means fine particles of silica anhydride obtained by the gas-phase process. As the silica fine particles to be employed for the invention, fine particles of gas-phase process silica are particularly preferable.

The foregoing gas-phase process silica is different from hydrated silica in the density of silanol group on the surface, existence of voids, and the like and is suitable for forming a three-dimensional structure with a high porosity. The reason for that is unclear. However it is supposed that, in the case of hydrated silica, the density of silanol group on the surface of fine particles is as high as 5 to 8/nm² and silica fine particles are easy to densely aggregate, whereas in the case of the gas-phase process silica, the density of silanol group on the surface of fine particles is as low as 2 to 3/nm² and therefore silica fine particles sparsely and softly flocculate and as a result, form a structure with a high porosity.

Since the above-mentioned gas-phase process silica particularly has a high specific surface area, high ink absorbency and retention efficiency can be obtained. And due to a low refractive index of the gas-phase process silica, the silica can provide a accepting layer with transparency and an image with high color density and excellent coloring property can be obtained thereon, if dispersion is carried out to the extent that the particle diameter becomes proper. The transparency of the accepting layer is important in achieving a high color density and excellent coloring property not only for the use such as OHP or the like for which transparency is required but also for the use for recording sheets such as photo glossy paper or the like.

Generally, the average particle diameter of primary particles of the gas-phase process silica is 50 nm or less, preferably 20 nm or less, particularly preferably 10 nm or less, and most preferably in a range from 3 to 10 nm. Since particles of the gas-phase process silica easily adhere to each other by hydrogen bond due to the silanol groups, a structure of a high porosity can be formed when the average primary particle diameter is 50 nm or less. In that case, the ink absorbency of the particles can be efficiently improved.

Further, silica fine particles can be used in combination with the above-mentioned other fine particles. When the gas-phase process silica is used in combination with the other fine particles, the content of the gas-phase process silica is preferably 30% by mass or higher, further preferably 50% by mass or higher.

As the inorganic fine particles to be employed for the invention, alumina fine particles, alumina hydrate, their mixture or composite are also preferable. Among them, alumina hydrate is preferable since it excellently absorbs and fixes ink and particularly, pseudo-boehmite ($Al_2O_3 \cdot n\, H_2O$) is preferable. With respect to alumina hydrate, those in various forms may be employed. However boehmite in sol state is preferable as a raw material since it easily gives a smooth layer.

The porous structure of the pseudo-boehmite preferable has an average pore diameter in a range from 1 to 25 nm, more preferably 2 to 10 nm. The pore volume is preferably 0.3 to 2.0 cc/g, more preferably 0.5 to 1.5 cc/g. Here, the measurement of the foregoing pore diameter and the pore volume is carried out by nitrogen absorbing and desorbing method and for example, the measurement can be carried out using a gas absorbing and desorbing analyzer (e.g., trade name "Omnisorp 369" manufactured by Coulter, Inc.).

Further, among alumina fine particles, fine particles of gas-phase process alumina have a large specific surface area and therefore they are preferable. The average primary particle diameter of the fine particles of gas-phase process alumina is 50 nm or less, further preferably 20 nm or less.

Also, colloidal silica having an average primary particle diameter of 50 nm or less can be cited as an example of preferable particles.

Thus, silica fine particles, colloidal silica, alumina fine particles, and pseudo-boehmite are preferable as inorganic fine particles according to the invention.

In the case the above-mentioned fine particles are employed for ink-jet recording sheets, the particles can be employed in manners disclosed in JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093., 8-174992, 11-192777, and 2001-301,314.

Cationic Polymer

As the cationic polymer used as a dispersing agent according to the invention, polymers having primary to tertiary amino groups or quaternary ammonium group as a cationic group are preferable.

As the above-mentioned cationic polymers, homopolymers of monomers (cationic monomers) having one selected from primary to tertiary amino groups, their salts, or quaternary ammonium group are preferable. And copolymers or condensation polymers of those cationic monomers with other monomers (hereinafter, referred to as "non-cationic monomers") are also preferable. Further, water-soluble polymers of these polymers and water-dispersible latex particles of these polymers can both be used.

The above-mentioned monomers (cationic monomers) include, for example, trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenyzlammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride;

trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

quaternary compounds of methyl chloride, ethyl chloride, methyl bromide, ethyl bromide, methyl iodide, and ethyl iodide, or their anion-substituted sulfonates, alkylsulfonates, acetates, and alkylcarboxylates of N,N-dimethylaminoethyl (meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth) acrylamide, N,N-diethylaminoethyl(meth)acrylamide, N,N-dimethylaminopropyl (meth)acrylamide, and N,N-diethylaminopropyl(meth)acrylamide.

Specifically, the monomers include, for example, monomethyldiallylammonium chloride, trimethyl-2-(methacryloyloxy)ethylammonium chloride, triethyl-2-(methacryloyloxy) ethylammonium chloride, trimethyl-2-(acryloyloxy) ethylammonium chloride, triethyl-2-(acryloyloxy)ethylammonium chloride, trimethyl-3-(methacryloyloxy)propylammonium chloride, triethyl-3-(methacryloyloxy) propylammonium chloride, trimethyl-2-(methacryloylamino) ethylammonium chloride, triethyl-2-(methacryloylamino) ethylammonium chloride, trimethyl-2-(acryloylamino) ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino) propylammonium chloride, triethyl-3-(acryloylamino)propylammonium chloride;

N,N-dimethyl-N-ethyl-2-(methacryloyloxy) ethylammonium chloride, N,N-diethyl-N-methyl-2-(methacryloyloxy) ethylammonium chloride, N,N-dimethyl-N-ethyl-3-(acryloylamino) propylammonium chloride, trimethyl-2-(methacryloyloxy) ethyl ammonium bromide, trimethyl-3-(acryloylamino)propylammonium bromide, trimethyl-2-(methacryloyloxy) ethylammonium sulfonate, trimethyl-3-(acryloylamino) propylammonium acetate and the like.

As other copolymerizable monomers, N-vinylimidazole, N-vinyl-2-methylimidazole and the like can be cited.

Further, allylamine, diallylamine and its derivatives, salts and the like can be used. Examples of such compounds include allylamine, allylamine hydrochloride, allylamine acetate, allylamine sulfate, diallylamine, diallylamine hydrochloride, diallylamine acetate, diallylamine sulfate, diallylmethylamine and its salts (the salts include, for example, hydrochloride, acetate, sulfate, and the like), diallylethylamine and its salts (the salts include, for example, hydrochloride, acetate, sulfate, and the like), diallyldimethylammonium salts (anions to be coupled with the salts include chloride, acetic acid ion, sulfuric acid ion and the like). Incidentally, since these allylamine derivatives and diallylamine derivatives, in a form of amines, show poor polymerizability, generally polymerization is carried out in a form of salts and if necessary, desalination is carried out.

Further, a method consisting of polymerizing monomer units such as N-vinylacetamide, N-vinylformamide and the like or their salts, and obtaining vinylamine units by hydrolyzing thus-produced polymers is also usable.

The above-mentioned non-cationic monomers refer to monomers containing no basic or cationic portion such as primary to tertiary amino groups, their salts or quaternary ammonium base and showing no or little mutual reaction with dyes in ink-jet ink.

The foregoing non-cationic monomers include, for example, (meth)acrylic acid alkyl ester; (meth)acrylic acid cycloalkyl ester such as cyclohexyl(meth)acrylate; (meth) acrylic acid aryl ester such as phenyl(meth)acrylate acid; aralkyl ester such as benzyl (meth)acrylate; aromatic vinyls such as styrene, vinyltoluene, α-methylstyrene and the like; vinyl esters such as vinyl acetate, vinyl propionate, vinyl versatate and the like; ally esters such as ally acetate and the like; halogen-containing monomers such as vinylidene chloride, vinyl chloride, and the like; vinyl cyanide such as (meth) acrylonitrile; olefins such as ethylene, propylene, and the like.

As the foregoing (meth)acrylic acid alkyl ester, (meth) acrylic acid alkyl esters having the alkyl portions comprising 1 to 18 carbons are preferable. And, for example, methyl (meth)acrylate, ethyl(meth)acrylate, propyl(meth)acrylate, isopropyl (meth)acrylate, n-butyl(meth)acrylate, isobutyl (meth)acrylate, tert-butyl (meth)acrylate, hexyl(meth)acrylate, octyl(meth)acrylate, 2-ethylhexyl(meth)acrylate, lauryl (meth)acrylate, and stearyl(meth)acrylate can be cited.

Among them methyl acrylate, ethyl acrylate, methyl methacrylate, ethyl methacrylate, and hydroxyethyl methacrylate are preferable.

The above-mentioned non-cationic monomers may also be used solely or in combination of two or more kinds of them.

Further, as the cationic polymers, preferable examples are polydiallyldimethyl ammonium chloride, polymethacryloyloxyethyl-β-hydroxyethyldimethylammonium chloride, polyethylene imine, polyallylamine and its derivatives, polyamide-polyamine resin, starch made cationic, dicyanodiamidoformalin condensate, dimethyl-2-hydroxypropylammonium salt polymer, polyamidine, polyvinylamine, dicyano-based cationic resin such as dicyanodiamide-formalin condensation polymer, polyamine-based cationic resin such as dicyanoamide-diethylenetriamine condensation polymer, epichlorohydrin-dimethylamine addition polymer, dimethyldiallyammonium chloride-$SO_2$ copolymer, diallylamine salt-$SO_2$ copolymer, (meth)acrylate-containing polymer having quaternary ammonium salt-substituted alkyl group in the ester portion, and styryl type polymer having quaternary ammonium base-substituted alkyl group.

As the foregoing cationic polymers, specific examples are those disclosed in JP-A Nos. 48-28325, 54-74430, 54-124726,55-22766, 55-142339, 60-23850, 60-23851, 60-23852, 60-23853, 60-57836, 60-60643, 60-118834, 60-122940, 60-122941, 60-122942, 60-235134, 1-161236, U.S. Pat. Nos. 2,484,430, 2,548,564, 3,148,061, 3,309,690, 4,115,124, 4,124,386, 4,193,800, 4,273,853, 4,282,305, 4,450,224, JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, 2001-301314, Japanese Patent Application Publication (JP-B) Nos. 5-35162, 5-35163, 5-35164, 5-88846, JP-A Nos. 7-118333, 2000-344990, Japanese Patent Nos. 2,648,847, and 2,661,677. Among them, polyallylamine and its derivatives are preferable and in terms of structure, diallyl dimethyl cationic polymers are preferable.

As the foregoing polyallylamine or its derivatives, a variety of well-known allylamine polymers and their derivatives can be used. Such derivatives include salts between polyallylamines and acids (the acids include inorganic acids such as hydrochloric acid, sulfuric acid, phosphoric acid, nitric acid and the like; organic acids such as methanesulfonic acid, toluenesulfonic acid, acetic acid, propionic acid, cinnamic acid, (meth)acrylic acid, and the like; or their combinations; allylamines partially forming salts); derivatives obtained by polymer reaction of polyallylamines; copolymers of polyallylamines and other copolymerizable monomers (specific examples of the monomers include (meth)acrylic acid esters, styrenes, (meth)acrylamides, acrylonitrile, vinyl esters and the like).

Specific examples of the polyallylamines and their derivatives include those described in JP-B Nos. 62-31722, 2-14364, 63-43402, 63-43403, 63-45721, 63-29881, 1-26362, 2-56365, 2-57084, 4-41686, 6-2780, 6-45649, 6-15592, 4-68622, Japanese Patent Nos. 3,199,227, 3,008, 369, JP-A Nos. 10-330427, 11-21321, 2000-281728, 2001-106736, 62-256801, 7-173286, 7-213897, 9-235318, 9-302026, 11-21321, WO 99/21901, WO 99/19372, JP-A No. 5-140213, and Japanese Patent Application National Publication (Laid-Open) No. 11-506488.

As the cationic polymers in the invention, diallyldialkyl cationic polymers are preferable and particularly, diallyldimethyl cationic polymer is preferable.

As the cationic polymer in the invention, from a viewpoint of dispersibility and particularly prevention of viscosity increase, cationic polymers with a weight average molecular weight of 60,000 or lower, particularly 40,000 or lower, are preferable.

Sulfate Ion

The sulfate ion concentration in a cationic polymer in a dispersion of the invention has to be suppressed to 1.5% by mass or lower in order to prevent viscosity increase of the dispersion. The sulfate ion is contained in a polymerization initiator used at the time of cationic polymer production and remains in the polymer. Accordingly, it is preferable to use a polymerization initiator which does not release sulfate ion.

Further, as a solvent of the dispersion, water, an organic solvent, or mixed solvent thereof can be used. As an organic solvent to be used for coating, alcohols such as methanol, ethanol, n-propanol, iso-propanol, methoxypropanol and the like, ketones such as acetone, methyl ethyl ketone and the like, tetrahydrofuran, acetonitrile, ethyl acetate, toluene and the like can be cited as examples.

Further, the addition amount of the foregoing cationic polymer to the fine particles is preferably from 0.1% by mass to 30% by mass, further preferably from 1% by mass to 10% by mass.

To produce the dispersion according to the invention, a method can be cited, which includes step of adding fine particles and a cationic polymer to a solvent (for example, the silica fine particles in water have a concentration in a range from 10% by mass to 20% by mass) and step of dispersing the particles and the polymers by using KDL-PILOT manufactured by Shinmaru Enterprises Corporation.

In the first embodiment, the preparation of the dispersion containing the foregoing fine particles and the cationic polymer may be carried out by previously preparing a fine particle dispersion and then adding the dispersion to a cationic polymer solution, or adding the cationic polymer solution to the fine particle dispersion, or simultaneously mixing both. Or a method of adding fine particles in form of powder, but not in form of dispersion, to the cationic polymer solution as described above can be employed.

After the foregoing fine particles and cationic polymer are mixed, the mixed solution is granulated by employing a dispersing apparatus to obtain a dispersion of the fine particles. As the dispersing apparatus to be employed for the water-based dispersion, a variety of conventionally known dispersing apparatuses such as a high speed rotation dispersing apparatus, a medium stirring type dispersing apparatus (such as a ball mill, a sand mill or the like), an ultrasonic dispersing apparatus, a colloid mill dispersing apparatus, a high pressure dispersing apparatus can be employed. However from a viewpoint that dispersion of agglomerates of fine particles should be efficiently carried out, the medium stirring type dispersing apparatus, a colloid mill dispersing apparatus, or a high pressure dispersing apparatus is preferable.

In the second embodiment, in order to pre-disperse a solution containing the above-mentioned fine particles and cationic polymer, the pre-dispersion can be carried out by previously preparing a fine particle dispersion and then adding the dispersion to a cationic polymer solution, or adding the cationic polymer solution to the fine particle dispersion, or simultaneously mixing both. Alternatively, fine particles in form of powder but not in form of dispersion can be added to the cationic polymer solution as described above. After the pre-dispersion in such a manner, the above-mentioned treatment of leaving the dispersion and/or heating treatment are/is carried out. In the case the treatment of leaving the dispersion and/or heating treatment are/is applied to the dispersion after undermentioned granulating step, the treatment(s) may be omitted in this stage.

The pre-dispersion produced in such a manner is then granulated. The granulating is carried out by granulating the pre-dispersion by using a dispersing apparatus to obtain a dispersion of fine particles. As the dispersing apparatus to be employed for the water-based dispersion, a variety of conventionally known dispersing apparatuses such as a high speed rotation dispersing apparatus, a medium stirring type dispersing apparatus (such as a ball mill, a sand mill or the like), an ultrasonic dispersing apparatus, a colloid mill dispersing apparatus, a high pressure dispersing apparatus can be employed, however from a viewpoint that dispersion of arising flocculates of fine particles should be efficiently carried out, the medium stirring type dispersing apparatus, a colloid mill dispersing apparatus, or a high pressure dispersing apparatus is preferable.

After granulating, the above-mentioned treatment of leaving the dispersion and/or heating treatment is carried out. In the case the treatment of leaving the dispersion and/or heating treatment are/is applied to the dispersion after the foregoing pre-dispersion, the treatment may be omitted in this stage.

Next, an ink-jet recording sheet of the invention will be described.

The ink-jet recording sheet of the invention has a rapid drying property and is capable of giving a high color density and glossy feel since it contains a dispersion of the invention, a water-soluble resin and if necessary, a cross-linking agent, a mordant, and the like in a coloring agent accepting layer.

Water-Soluble Resin

As a water-soluble resin according to the invention, for example, polyvinyl alcohol-based resin, which is a resin having hydroxy group as a hydrophilic structure unit [polyvinyl alcohol (PVA), acetoacetyl-modified polyvinyl alcohol, cation-modified polyvinyl alcohol, anion-modified polyvinyl alcohol, silanol-modified polyvinyl alcohol, polyvinyl acetal and the like], cellulose-based resin [methyl cellulose (MC), ethyl cellulose (EC), hydroxyethyl cellulose (HEC), carboxymethyl cellulose (CMC), hydroxypropyl cellulose (HPC), hydroxyethylmethyl cellulose, hydroxypropylmethyl cellulose and the like], chitins, chitosans, starch, resin having ether bond [polyethylene oxide (PEO), polypropylene oxide (PPO), polyethylene glycol (PEG), polyvinyl ether (PVE), and the like], carbamoyl-containing resin [polyacrylamide (PAAM), polyvinylpyrrolidone (PVP), poly(acrylic acid) hydrazide and the like] can be cited.

Further, polyacrylate having carboxyl group as a dissociative group, maleic acid resin, alginic acid salt, gelatins and the like can be also cited.

Among them, polyvinyl alcohol-based resin is particularly preferable. Examples of the polyvinyl alcohol are those described in JP-B Nos. 4-52786, 5-67432, 7-29479, Japanese Patent No. 2,537,827, JP-B No. 7-57553, Japanese Patent Nos. 2,502,998, 3,053,231, JP-A No. 63-176,173, Japanese Patent No. 2,604,367, JP-A Nos. 7-276787, 9-207425, 11-58941, 2000-135858, 2001-205924, 2001-287444, 62-278080, 9-39373, Japanese Patent No. 2,750,433, JP-A Nos. 2000-158801, 2001-213045, 2001-328345, 8-324105, 11-348417 and the like.

Further, as examples of the water-soluble resin other than the polyvinyl alcohol-based resin, compounds described in paragraphs [0011] to [0014] of JP-A No. 11-165461 can be also cited as examples.

These water-soluble resins may be used solely or in combination of two or more types.

The content of the water-soluble resin in the invention is preferably from 9% by mass to 40% by mass, more preferably from 12% by mass to 33% by mass to the whole solid content mass in the coloring agent accepting layer.

Each of the foregoing fine particles and water-soluble resin, which is main component of the coloring agent accepting layer according to the invention, may be made of single material or mixtures of a plurality of materials, respectively.

Incidentally, from a viewpoint of retention of transparency, the type of water-soluble resin to be used in combination with fine particles, particularly silica fine particles, is important. In the case of using the above-mentioned gas-phase process silica, as the water-soluble resin, polyvinyl alcohol-based resin is preferable and polyvinyl alcohol-based resin having a saponification degree in a range from 70% to 100% is more preferable and polyvinyl alcohol-based resin with a saponification degree in a range from 80% to 99.5% is particularly preferable.

The above-mentioned polyvinyl alcohol-based resin has hydroxyl group in its structure unit. Since a hydrogen bond is formed between the hydroxyl group of the polyvinyl alcohol-based resin and silanol group on the surface of the foregoing silica fine particles, it becomes easy to form a three-dimensional mesh structure having secondary particles of silica fine particles as mesh chain units. It is supposed that the formation of three-dimensional mesh structure enables a coloring agent accepting layer to have a porous structure with a high porosity and a sufficient strength.

In ink-jet recording, the porous coloring agent accepting layer obtained in the above-mentioned manner quickly absorbs ink by capillarity and dots with excellent circularity can be formed without being accompanied with ink blurring.

Further, the polyvinyl alcohol-based resin may be used in combination with the foregoing other water-soluble resins. In the case other water-soluble resins and the foregoing polyvinyl alcohol-based resin are used in combination, the content of the polyvinyl alcohol-based resin is preferably from 50% by mass or more, more preferably 70% by mass or more, on the basis of the entire water-soluble resins.

Content Ratio of Fine Particles and Water-Soluble Resin

The content ratio by mass [PB ratio (x/y)] of the fine particles (x) and the water-soluble resin (y) significantly affects the film structure and the film strength of the coloring agent accepting layer. That is, if the content ratio by mass [PB ratio (x/y)] is increased, the porosity becomes higher, pore volume, and the surface area (per unit mass) become larger, meanwhile the density and the strength tend to decrease.

With respect to the coloring agent accepting layer accoring to the invention, the foregoing content ratio by mass [PB ratio (x/y)] is preferably from 1.5 to 10.

In the case a recording sheet is transmitted through a transferring system of an ink-jet printer, stress may be applied to the recording sheet in some cases, so, the coloring agent accepting layer is required to have sufficiently high film strength. Further, also from a viewpoint of prevention of cracking and peeling of the coloring agent accepting layer when cutting them into sheet-like state, the coloring agent accepting layer is also required to have sufficient film strength. Taking such cases into consideration, the foregoing ratio by mass (x/y) is preferably 5 or lower and from a viewpoint of retention of the high speed ink absorbency in an ink-jet printer, the ratio is preferably 2 or higher.

For example, in the case a coating solution obtained by completely dispersing gas-phase process silica fine particles having an average primary particle diameter of 20 nm or less and a water-soluble resin in a ratio by mass (x/y) from 2 to 5 in an aqueous solution is applied to a support and the coating layer is dried, a three-dimensional mesh structure of mesh chains composed of the secondary particles of the silica fine particles can be formed and thus a transparent porous film with an average pore diameter of 25 nm or less, a porosity in a range from 50% to 80%, pore specific volume of 0.5 ml/g or higher, and specific surface area of 100 m$^2$/g or higher can easily be formed.

Cross-Linking Agent

The coloring agent accepting layer of a sheet of ink-jet recording according to the invention is preferably a porous layer formed by forming a coating layer containing fine particles and water-soluble resin and a cross-linking agent capable of cross-linking the water-soluble resin as well and curing the coating layer by cross-linking reaction of the cross-linking agent and water-soluble resin.

For cross-liking the above-mentioned water-soluble resin, particularly polyvinyl alcohol, a boron compound is preferable. The foregoing boron compound includes, for example, borax, boric acid, boric acid salts [e.g., orthoborates, $InBO_3$, $ScBO_3$, $YBO_3$, $LaBO_3$, $Mg_3(BO_3)_2$, $Co_3(BO_3)_2$, diborates (e.g., $Mg_2B_2O_5$, $Co_2B_2O_5$), metaborates (e.g., $LiBO_2$, $Ca(BO_2)_2$, $NaBO_2$, $KBO_2$), tetraborates (e.g., $Na_2B_4O_7 \cdot 10H_2O$), pentaborates (e.g., $KB_5O_8 \cdot 4H_2O$, $Ca_2B_6O_{11} \cdot 7H_2O$, $CsB_5O_5$) and the like. Among them, borax, boric acid, and borates are preferable since they are capable of quickly causing cross-linking reaction and boric acid is particularly preferable.

As the cross-linking agent for the above-mentioned water-soluble resin, the following compounds other than the boron compounds can be used.

Examples are aldehyde type compounds such as formaldehyde, glyoxal, glutaraldehyde and the like; ketone type compounds such as diacetyl, cyclopentandione and the like; active halogen compounds such as bis(2-chloroethylurea)-2-hydroxy-4,6-dichloro-1,3,5-triazine, 2,4-dichloro-6-S-triazine-sodium salt and the like; active vinyl compounds such as divinylsulfonic acid, 1,3-divinylsulfonyl-2-propanol, N,N'-ethylenebis(vinylsulfonylacetamide), 1,3,5-triacryloyl-hexahydro-S-triazine and the like; N-methylol compounds such as dimethylol urea, methyloldimethylhydantoin, and the like; melamine resin (e.g., methylol melamine, alkylated methylol melamine); epoxy resin;

isocyanate type compounds such as 1,6-hexamethylene diisocyanate, aziridine type compounds described in U.S. Pat. Nos. 3,017,280 and 2,983,611; carboxyimide compounds described in U.S. Pat. No. 3,100,704; epoxy type compounds such as glycerol triglycidyl ether and the like; ethylene imino type compounds such as 1,6-hexamethylene-N,N'-bisethylene urea and the like; halogenated carboxyaldehyde type compounds such as mucochloric acid, mucophenoxychloric acid and the like; dioxane type compounds such as 2,3-dihydroxydioxane and the like; metal-containing compounds such as titanium lactate, aluminum sulfate, chrome alum, potassium alum, zirconyl acetate, chrome acetate, and the like; polyamine compounds such as tetraethylene pentamine and the like; hydrazide compounds such as adipic acid dihydrazide and the like; and low molecular weight compounds or polymers having two or more oxazoline groups.

The above-mentioned cross-linking agents may be used solely or in combination of two or more of them.

Cross-linking curing is preferably carried out by adding a cross-linking agent to a coating solution (hereinafter, referred to as "coating solution A" in some cases) containing fine particles and a water-soluble resin and/or the following basic solution and supplying the basic solution (hereinafter, referred to as "coating solution B" in some cases) with pH 8 or higher to the coating layer either simultaneously with (1) formation of the coating layer by applying the foregoing coating solution or during (2) drying period of the coating layer formed by applying the coating solution and before the coating layer shows falling drying rate. The foregoing supply of the cross-linking agent is preferably carried out as follows while using a boron compound as the agent, as an example. In the case the coloring agent accepting layer is a layer formed by cross-linking and curing a coating layer formed by applying the coating solution (the coating solution A) containing fine particles and water-soluble resins including polyvinyl alcohol, the cross-linking and curing is carried out by supplying the basic solution (the coating solution) with pH 8 or higher to the coating layer either simultaneously with (1) application of the foregoing coating solution or during (2) drying period of the coating layer formed by applying the foregoing coating solution and before the coating layer shows falling drying rate. The boron compound, which is a cross-linking agent, may be added to either the coating solution A or the coating solution B and may be added to both the coating solution A and the coating solution B.

The amount of the cross-linking agent is preferably from 1% by mass to 50% by mass, more preferably 5% by mass to 40% by mass, based on the water-soluble resin.

Mordant

According to the invention, it is preferable to add a mordant to the coloring agent accepting layer in order to improve the water resistance and resistance to aging blurring of formed images.

With respect to the foregoing mordant, the above-mentioned cationic polymers (cationic mordant) as an organic mordant or inorganic mordants are preferable. The coloring agent accepting layer containing the foregoing mordant interacts with liquid ink containing an anionic dye as a coloring material. And, the water resistance and resistance to aging blurring of an image formed on the coloring agent accepting layer are improved. The organic mordants or inorganic mordants may respectively be used or the organic mordants and inorganic mordants may be used in combination.

For coating a mordant, the mordant may be added to the coating solution (the coating solution A) containing fine particles and a water-soluble resin, or added to the coating solution B to prevent foreseen aggregation between the mordant and the fine particles.

As a mordant according to the invention, an inorganic mordant may be used and the inorganic mordant includes water-soluble polyvalent metal salts and hydrophobic polyvalent metal salt compounds.

Specific examples of the inorganic mordant are, for example, salts or complexes of metals selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Specifically, the mordant includes calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, cupric ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, basic poly(aluminum hydroxide), aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconium ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphorus tungstate, sodium tungsten citrate, dodecatungstophosphoric acid n-hydrate, dodecatungstosilicic acid hexacosahydrate, molybdenum chloride, dedecamolybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodium nitrate, neodymium nitrate, samarium nitrate, europium nitrate, gadolinium nitrate, dysprosium nitrate, erbium nitrate, ytterbium nitrate, hafnium chloride, bismuth nitrate and the like.

As the inorganic mordant for the invention, aluminum-containing compounds, titanium-containing compounds, zirconium-containing compounds, compounds of metals (salts or complexes) in group IIIB elements in a periodic table, are preferable.

The content of the foregoing mordant contained in the coloring agent accepting layer of the invention is preferably from 0.01 $m^2$/g to 5 $m^2$/g, more preferably 0.1 $m^2$/g to 3 $m^2$/g.

Other Components

An ink-jet recording sheet of the invention may further contain a variety of known additives if necessary, for example, an acid, an ultraviolet ray absorber, an anti-oxidation agent, a fluorescent brightening agent, a monomer, a polymerization initiator, a polymerization inhibitor, anti-blurring agent, a preservative, a viscosity stabilizer, a defoaming agent, a surfactant, an antistatic agent, a mat agent, a curling preventive agent, a water proofing agent and the like.

In the invention, the coloring agent accepting layer may contain an acid. By adding an acid, the surface of the coloring agent accepting layer is adjusted to be from pH 3 to 8, preferably from pH 5 to 7.5. Accordingly, the resistance to yellowing discoloration in white background portion can be preferably improved. The measurement of pH on the surface may be carried out by A method (application method) among methods for measuring pH on surface determined by Japanese Technology Associate of Paper and Pulp Industry (J. TAPPI). For example, the measurement may be carried out by using "model MPC", a pH measurement set for paper sheet, manufactured by KYORITSU CHEMICAL-CHECK Lab., Corp., corresponding to the foregoing A method.

Specific examples of the acid include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, salicylic acid metal salts (salts of Zn, Al, Ca, Mg and the like), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanyl acid, sulfamine acid, α-resorcylic acid, β-resorcylic acid, γ-resorcylic acid, gallic acid, phloroglucin, sulfosalicylic acid, ascorbic acid, sorbic acid, bisphenolic acid, hydrochloric acid, nitric acid, sulfuric acid, phosphoric acid, polyphosphoric acid, boric acid, phoronic acid and the like. The addition amount of these acid may be determined so as to adjust the pH of the surface of the coloring agent accepting layer to be from 3 to 8.

The above-mentioned acids may be used in form of metal salts (for example, salts of sodium, potassium, calcium, cesium, zinc, copper, iron, aluminum, zirconium, lanthanum, yttrium, magnesium, strontium, cerium and the like) or of amine salts (for example, ammonia, triethylamine, tributylamine, piperazine, 2-methylpiperazine, polyallylamine and the like).

In the invention, it is preferable to add a keeping quality improving agent such as an ultraviolet ray absorber, an anti-oxidation agent, a anti-blurring agent and the like.

As these ultraviolet ray absorber, anti-oxidation agent, and anti-blurring agent, alkylated phenol compounds (including hindered phenol compounds), alkylthiomethylphenol compounds, hydroquinone compounds, alkylated hydroquinone compounds, tocopherol compounds, thiodiphenyl ether compounds, compounds having two or more thio ether bonds, bisphenol compounds, O—, N— and S-benzyl compounds, hydroxybenzyl compounds, triazine compounds, phosphonate compounds, acylaminophenol compounds, ester compounds, amido compounds, ascrobic acid, amine-based anti-oxidation agents, 2-(2-hydroxyphenyl)benzotriazole compounds, 2-hydroxybenzophenone compounds, acrylates, water-soluble or hydrophobic metal salts, organometal compounds, metal complexes, hindered amine compounds (including TEMPO compounds), 2-(2-hydroxyphenyl)-1,3,5-triazine compounds, metal inactivation agents, phosphite compounds, phosphonite compounds, hydroxyamine compounds, nitron compounds, peroxide scavengers, polyamide stabilizers, polyether compounds, basic auxiliary stabilizer, nucleating agents, benzofuran compounds, indolinone compounds, phosphine compounds, polyamine compounds, thiourea compounds, urea compounds, hydrazide compounds, amidine compounds, saccharide compounds, hydroxybenzoic acid compounds, dihydroxybenzoic acid compounds, trihydroxybenzoic acid compounds and the like, can be cited as examples.

Among them, alkylated phenol compounds, compounds having two or more thioether bonds, bisphenol compounds, ascrobic acid, amine-based anti-oxidation agents, water-soluble or hydrophobic metal salts, organometal compounds, metal complexes, hindered amine compounds, hydroxyamine compounds, polyamine compounds, thiourea compounds, hydrazide compounds, hydroxybenzoic acid compounds, dihydroxybenzoic acid compounds, trihydroxybenzoic acid compounds and the like are preferable.

Specific examples of the compounds are those described in JP-A Nos. 2002-13005, 10-182621, 2001-260519, JP-B Nos. 4-34953, 4-34513, JP-A No.11-170686, JP-B No.4-34512, EP 1,138,509, JP-A Nos. 60-67190, 7-276808, 2001-94829, 47-10537, 58-111942, 58-212844, 59-19945, 59-46646, 59-109055, 63-53544, JP-B No. 36-10466, 42-26187, 48-30492, 48-31255, 48-41572, 48-54965, 50-10726, U.S. Pat. Nos. 2,719,086, 3,707,375, 3,754,919, 4,220,711, JP-B Nos. 45-4699, 54-5324 EP Laid-Open No.223,739, 309,401, 309,402, 310,551, 310,552, 459,416, Germany Patent Laid-Open No.3,435,443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437, 5-170361, JP-B Nos. 48-43295, 48-33212, U.S. Pat. Nos. 4,814,262, and 4,980,275.

The foregoing other components may be used solely or in combination of two or more of them. The foregoing other components may be added after being water-solubilized, dispersed, polymer-dispersed, emulsified, or added in the form of oil droplets, or added in the form of microcapsules encapsulating the components. In an ink-jet recording sheet according to the invention, the addition amount of the foregoing other components is preferably from 0.01 to 10 $m^2/g$.

For the purpose to improve the dispersibility of the inorganic fine particles, the surface of the inorganic fine particles may be treated with a silane coupling agent. As the silane coupling agent, those having an organic functional group [for example, vinyl group, amino group (primary to ternary amino group, quaternary ammonium salt group), epoxy group, mercapto group, chloro group, alkyl group, phenyl group, ester group and the like] other than a portion for carrying out coupling treatment are preferable.

According to the invention, the coating solution for the coloring agent accepting layer (the coating solution A) preferably contains a surfactant. As the surfactant, any of cationic, anionic, nonionic, amphoteric, fluorine-based, silicon-based surfactants can be used.

The foregoing nonionic surfactants include polyoxyalkylene alkyl ether and polyoxyalkylene alkylphenyl ethers (for example, diethylene glycol monoethyl ether, diethylene glycol diethyl ether, polyoxyethylene lauryl ether, polyoxyethylene stearyl ether, polyoxyethylene nonylphenyl ether and the like), oxyethylene-oxypropylene block copolymer, sorbitan fatty acid esters (for example, sorbitan monolaurate, sorbitan monooleate, sorbitan trioleate, and the like), polyoxyethylene sorbitan fatty acid esters (for example, polyoxyethylene sorbitan monolaurate, polyoxyethylene sorbitan monooleate, polyoxyethylene sorbitan trioleate, and the like), polyoxyethylene sorbitol fatty acid esters (for example, tetraoleic acid polyoxyethylene sorbitol and the like), glycerin fatty acid esters (for example, glycerol monooleate and the like), polyoxyethylene glycerin fatty acid esters (monostearic acid polyoxyethylene glycerin, monooleic acid polyoxyethylene glycerin and the like), polyoxyethylene fatty acid esters (polyethylene glycol monolaurate, polyethylene glycol monooleate, and the like), polyoxyethylene alkylamine, acetylene glycols (for example, 2,4,7,9-tetramethyl-5-decine-4,7-diol, ethylene oxide adduct of the diol, propylene oxide adduct of the diol and the like). Above all, polyoxyalkylene alkyl ethers are preferable. The foregoing nonionic surfactants can be used in the coating solution A and the coating solution B. Further, the foregoing nonionic surfactants may be used solely or in combination of two or more of them.

As the foregoing amphoteric surfactants, amino acid type ones, carboxyammonium betain type ones, sulfone ammonium betain type ones, ammonium sulfuric acid ester betain type ones, imidazolinium betain type ones can be cited and, for example, those described in U.S. Pat. No. 3,843,368, JP-A Nos. 59-49535, 63-236546, 5-303205, 8-262742, 10-282619 and the like can be preferably used. As the foregoing amphoteric surfactants, amino acid type amphoteric surfactants are preferable and as the amino acid type amphoteric surfactants, for example, those derived from amino acids (e.g. glycin, glutamic acid, histidine, and the like) as described JP-A No. 5-303205 can be cited and specifically, N-aminoacyl acid having a long chain acyl group introduced into and its salts can be cited. The foregoing amphoteric surfactants may be used solely or in combination of two or more of them.

As the foregoing anionic surfactants, fatty acid salts (for example, sodium stearate, potassium oleate), alkylsulfuric acid ester salts (for example, sodium laurylsulfate, laurylsulfuric acid triethanolamine), sulfonic acid salts (for example, sodium dodecylbenzenesulfonate), alkylsulfosuccinic acid salts (for example, sodium dioctylsulfosuccinate), alkyl diphenyl ether disulfonic acid salts, alkylphosphoric acid salts and the like, can be cited.

As the foregoing cationic surfactants, alkylamine salts, quaternary ammonium salts, pyridinium salts, imidazolinium salts can be cited.

As the foregoing fluorine-based surfactants, compounds can be cited which are derived from intermediates having perfluoroalkyl groups by a method such as electrolytic fluorination, telomerization, oligomerization and the like.

For example, perfluoroalkylsulfonic acid salts, perfluoroalkylcarboxylic acid salts, perfluoroalkyl ethylene oxide adducts, perfluoroalkyl trialkylammonium salts, perfluoroalkyl-containing oligomers, perfluoroalkyl phosphoric acid esters and the like can be cited.

As the foregoing silicon based surfactants, silicon oil modified by organic groups is preferable. And the silicon oil may have a siloxane structure of which side chains are modified by organic groups, a structure of which both terminals are modified by organic groups, a structure of which one terminal is modified by organic groups. As the modification with organic groups, amino-modification, polyether-modification, epoxy-modification, carboxyl-modification, carbinol-modification, alkyl-modification, aralkyl-modification, phenol-modification, fluoro-modification and the like can be cited.

The content of the surfactants according to the invention is preferably from 0.001% to 2.0%, more preferably 0.01% to 1.0%, based on the coating solution for the coloring agent accepting layer (the coating solution A). Further, in the case two or more solutions are applied as the coating solutions for the coloring agent accepting layer, it is preferable to add surfactants to the respective coating solutions.

In the invention, the coloring agent accepting layer preferably contains organic solvent having a high boiling point for preventing curling. The foregoing organic solvent having a high boiling point means organic compounds which have a boiling point of 150° C. or higher under ordinally pressure and are water-soluble or hydrophobic. These compounds may be in form of a liquid or a solid at room temperature and may have low molecular weights or high molecular weights.

Specific examples are aromatic carboxylic acid esters (for example, dibutyl phthalate, diphenyl phthalate, phenyl benzoate and the like), aliphatic carboxylic acid esters (for example, dioctyl adipate, dibutyl sebacate, methyl stearate, dibutyl maleate, dibutyl fumarate, triethyl acetylcitrate, and the like), phosphoric acid esters (for example, trioctyl phosphate, tricresyl phosphate, and the like), epoxy compounds (for example, epoxydated soybean oil, epoxydated fatty acid methyl, and the like), alcohols (for example, stearyl alcohol, ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanol amine, polyethylene glycol, and the like), plant oils (for example, soybean oil, sunflower oil, and the like), higher aliphatic carboxylic acid (for example, linoleic acid, oleic acid, and the like).

Support

As the support according to the invention, any of transparent supports made of transparent materials such as plastics and opaque supports made of opaque materials such as paper can be used. In order to make the best use of the transparency of the coloring agent accepting layer, it is preferable to use transparent supports or highly glossy opaque supports.

As the materials usable for the above-mentioned transparent supports, materials which are transparent and resistant to radiation heat when used for OHP, back light displays or the like. As such materials, for example, polyesters such as polyethylene terephthalate (PET); polysulfones, polyphenylene oxide, polyimide, polycarbonate, polyamide and the like can be cited. Among them, polyesters are preferable and particularly polyethylene terephthalate is preferable.

The thickness of the foregoing supports is not particularly limited, however it is preferably from 50 μm to 200 μm in terms of handling property.

As the highly glossy opaque supports, those having a glossiness of 40% or higher on the surface on the side which the coloring agent accepting layer will be formed are preferable. The foregoing glossiness is a value calculated according to the method described in JIS P-8142 (Method for testing mirror face glossiness at 75 degree of paper and paper sheet). Specifically, the following supports can be cited.

Glossy paper supports of such as art paper, coat paper, cast-coated paper, baryta paper used for supports for silver salt photography, and the like; highly glossy films made opaque by adding a white pigment or the like to plastic films (surface calendering treatment may optionally be carried out) of polyesters such as polyethylene terephthalate (PET) and the like, cellulose esters such as nitrocellulose, cellulose acetate, cellulose acetate butylate and the like, and of polysulfones, polyphenylene oxides, polyimides, polycarbonates, polyamides, and the like; or supports obtained by forming a coating layer of a polyolefin optionally containing a white pigment, on the surface of a variety of the foregoing paper supports, the foregoing transparent supports, or highly glossy films containing a white pigment or the like.

White pigment-containing foam polyester films (for example, foam PET having voids by adding polyolefin fine particles and carrying out expansion treatment) are also preferable examples. Further, resin-coated paper to be used for printing paper for silver salt photography is also preferable.

The thickness of the foregoing opaque supports is also not particularly limited, however it is preferably from 50 to 300 μm in terms of handling property.

Further, the supports whose surface is subjected to corona discharge treatment, glow discharge treatment, flame treatment, UV radiation treatment and the like in order to improve wettability and adhesion characteristics can be used.

Next, base paper to be used for the foregoing resin-coated paper will be described in details.

The foregoing base paper is manufactured mainly from wood pulp and, if necessary, synthetic pulp such as polypropylene or synthetic fibers of such as nylon, polyester or the like can be added to the wood pulp. The foregoing wood pulp include any of LBKP, LBSP, NBKP, NBSP, LDP, NDP, LUKP, and NUKP, and it is preferable to use LBKP, NBSP, LBSP, NDP, LDP, which have a higher content of short fibers, more than others.

Incidentally, the ratio of LBSP and/or LDP is preferably from 10% by mass to 70% by mass.

As the foregoing pulp, chemical pulp (e.g. sulfate pulp, sulfite pulp) with little impurities is preferably used and pulp having improved whiteness by bleaching treatment is also useful.

To the base paper, a sizing agent such as higher fatty acids, alkylketene dimers, a white pigment such as calcium carbonate, talc, titanium oxide, paper strength increasing agent such as starch, polyacrylamide, polyvinyl alcohol, and the like, a fluorescent brightener, water-retaining agent such as polyethylene glycols, a dispersant, a softening agent such as a quaternary ammonium and the like may be properly added.

The freeness of the pulp to be used for paper manufacturing is preferably 200 to 500 ml according to the standards of CSF and as to the fiber length after beating, the sum of % by mass of residues on 24 meshes and % by mass of residues on 42 meshes defined by JIS P-8207, is preferably from 30 to 70%. Additionally, the % by mass of residues on 4 meshes is preferably 20% by mass or less.

The weight of the base paper is preferably from 30 to 250 g, more preferably from 50 to 200 g. The thickness of the base paper is preferably from 40 to 250 μm. The base paper may be provided with high smoothness by calendering treatment during or after the paper manufacturing step. The base paper density is generally from 0.7 to 1.2 g/m² (JIS P-8118).

Further, the stiffness of the base paper is preferably from 20 to 200 g defined by JIS P-8143.

A surface sizing agent may be applied to the surface of the base paper and a sizing agent similar to the sizing agent to be added to the foregoing base paper may be applied.

It is preferable that the pH of base paper is from 5 to 9 by measurement with a hot water extraction method defined by JIS P-8113.

The polyethylene for coating the front surface and the back surface of the base paper is mainly a low density polyethylene (LDPE) and/or a high density polyethylene (HDPE) and other LLDPE and polypropylene may partially be used.

Particularly, the polyethylene layer on the side which the coloring agent accepting layer is to be formed, as it is widely performed in printing paper for photography, preferably contains a rutile or anatase type titanium oxide, a fluorescent brightener, ultramarine in the polyethylene to improve the opaque property, whiteness, and hue. Here, the content of titanium oxide is preferably from about 3% by mass to about 20% by mass, more preferably from 4% by mass to 13% by mass, based on polyethylene. The thickness of the polyethylene layer is not particularly limited, however it is preferably 10 to 50 μm in both front and back surface sides. Further, an undercoat layer can be formed on the polyethylene layer to improve contact characteristics with the coloring agent accepting layer. As the undercoat layer, water-soluble polyesters, gelatin, and PVA are preferable. The thickness of the undercoat layer is preferably from 0.01 to 5 μm.

The polyethylene-coated paper may be used for glossy paper. It may also used for a paper with a mat face or silky face similar to that of printing paper for photography, which is obtained by carrying out so-called forming when polyethylene is melted, extruded, and coated onto the surface of the base paper.

A back coat layer may be formed on a support and components that can be added to the back coat layer are white pigment, water-soluble binder, and other components.

The white pigment to be added to the back coat layer includes, for example, inorganic white pigments such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolites, hydrated halloysite, magnesium carbonate, magnesium hydroxide and the like and organic pigments such as styrene type plastic pigments, acrylic type plastic pigments, polyethylene, microcapsule, urea resin, melamine resin and the like.

The water-soluble binder to be employed for the back coat layer includes, for example, water-soluble polymers such as styrene/maleic acid salt copolymers, styrene/acrylic acid salt copolymers, polyvinyl alcohol, silanol-modified polyvinyl alcohol, starch, starch made to be cationic, casein, gelatin, carboxymethyl cellulose, hydroxyethyl cellulose, polyvinyl pyrrolidone and the like and water-dispersible polymers such as styrene butadiene latex, acrylic emulsions and the like.

Other components to be added to the back coat layer include, for example, a defoaming agent, a foam inhibitor, a dye, a fluorescent brightener, a preservative, a water proofing agent and the like.

Production of Ink-Jet Recording Sheet

A coloring agent accepting layer of an ink-jet recording sheet of the invention is preferable to be formed by, for example, a method (Wet-on-Wet method) containing steps of applying a coating solution A containing at least fine particles and a water-soluble resin and supplying a coating solution B which is at pH 8 or higher either simultaneously with (1) the application or during (2) drying period of the coating layer formed by applying the coating solution and before the coating layer shows falling drying rate and then cross-linking and curing a coating layer to which the coating solution B is added. In this case, a cross-linking agent for cross-linking the foregoing water-soluble resin is preferably added at least either one or both of the foregoing coating solution A and coating solution B.

Formation of the coloring agent accepting layer by cross-linking and curing in such a manner is preferable in terms of ink absorbency and prevention of cracking of the film.

If a mordant is added to the coating solution B, a large quantity of the mordant exists in the vicinity of the surface of the coloring agent accepting layer, so that a coloring agent for ink-jet printing can be sufficiently mordanted, so water resistance of the letters and images after printing is preferably improved. A portion of the mordant may be added to the foregoing coating solution A and in such a case, the mordant for the coating solution A may be similar or dissimilar to that of the coating solution B.

According to the invention, the coating solution (coating solution A) for the coloring agent accepting layer containing at least fine particles (for example, gas-phase process silica) and water-soluble resin (for example, polyvinyl alcohol) may be prepared, for example, as follows.

Fine particles of gas-phase process silica or the like and a cationic polymer dispersant are added to water (for example, content of the silica fine particles in water is in a range from 10% by mass to 20% by mass) and dispersed by high speed rotation, for example, at 10,000 rpm (preferably from 5,000 to 20,000 rpm) for 20 minutes (preferably from 10 to 30 minutes) using a high speed wet type colloid mill (for example, "Clear Mix" manufactured by M Techniques Co., Ltd.) to obtain a dispersion according to the invention and then, an aqueous solution containing a cross-linking agent (a boron compound or the like, which may be added to the coating solution A), a water-soluble resin polyvinyl alcohol (PVA) and the like is added to the dispersion (for example, in a manner that PVA is adjusted to be about 1/3 by weight of the foregoing gas-phase process silica ) and dispersed under rotation conditions same as described above to obtain the coating solution. The obtained solution is in even sol state and by applying the coating solution on a support and drying it by the following coating method, a porous coloring agent accepting layer with a three-dimensional mesh structure can be formed. The preparation of the coating solution A is not limited to the above-mentioned method.

As solvents in the respective steps, water, organic solvents or their mixed solvents may be used. As the organic solvents which are used for the coating, alcohols such as methanol, ethanol, n-propanol, iso-propanol, methoxypropanol, and the like, ketones such as acetone, methyl ethyl ketone and the like, and tetrahydrofuran, acetonitrile, ethyl acetate, toluene and the like can be cited.

Application of the coating solution for the coloring agent accepting layer may be carried out by known coating methods using, for example, an extrusion die coater, an air doctor coater, a bread coater, a rod coater, a knife coater, a squeeze coater, a reverse roller coater, a bar coater and the like.

Simultaneously with or after application of the coating solution for the coloring agent accepting layer (the coating solution A), a coating solution B is supplied to the coating layer. The foregoing coating solution B may be supplied before the coating layer after the application shows falling drying rate. That is, after application of the coating solution for the coloring agent accepting layer (the coating solution A), the mordant is preferably introduced when the coating layer is still in constant ratio drying period, to produce an ink-jet recording sheet.

Here, the foregoing phrase "before the coating layer shows a falling drying rate " generally means a period of several minutes immediately after application of the coating solution for the coloring agent accepting layer. During the period, "constant ratio drying speed" phenomenon, that is, phenomenon wherein the content of the solvent (a dispersion medium) in the applied coating layer is decrease proportionally with the time, can be observed. With respect to the period of "constant ratio drying speed", descriptions are given, for example, in Chemical Engineering Handbook (pp. 707-712, published by Maruzene Co., Ltd, Oct. 25, 1980).

As described above, after application of the coating solution A, the coating layer is dried until it shows falling drying rate and the drying is generally carried out in a range of 40 to 180° C. for 0.5 to 10 minutes (preferably for 0.5 to 5 minutes). The drying period differs naturally depending on the coated amount, however it is generally preferable that the period is in the above-mentioned range.

As the method for supplying the coating solution B before the above-mentioned first coating layer shows the falling drying rate, (1) a method by overcoating the coating solution B further onto the coating layer, (2) a method by spraying the coating solution B by a spray or the like, (3) a method by immersing the support on which the coating layer is formed in the coating solution B, or the like can be cited.

In the above-mentioned method (1), as the method for applying the coating solution B, for example, known coating methods using a curtain flow coater, an extrusion die coater, an air doctor coater, a bread coater, a rod coater, a knife coater, a squeeze coater, a reverse roller coater, a bar coater and the like can be employed. However, it is preferable to employ methods in which coaters are kept from direct contact with the already formed first coating layer, just like the extrusion die coater, the curtain flow coater, the bar coater and the like.

After supply of the coating solution B, it is general to carry out heating in a range of 40 to 180° C. for 0.5 to 30 minutes to dry and cure the coating layer. Above all, it is preferable to carry out heating in a range of 40 to 150° C. for 1 to 20 minutes.

Further, in the case the coating solution B is supplied simultaneously with application of the coating solution for the coloring agent accepting layer (the coating solution A), the coating solution A and the coating solution B can be simultaneously coated (multiple layer coating) on a support, wherein the coating solution A is brought into contact with the support. Then the coated layer is dried and cured to form the coloring agent accepting layer.

The above-mentioned simultaneous coating (multiple layer coating) can be carried out by a coating method using, for example, an extrusion die coater or a curtain flow coater. After the simultaneous coating, the formed coating layers are dried. Drying is generally carried out by heating the coating layers in a range of 40 to 150° C. for 0.5 to 10 minutes, preferably in a range of 40 to 100° C. for 0.5 to 5 minutes.

In the case above-mentioned simultaneous coating (multiple layer coating) is carried out by using, for example, an extrusion die coater, the two types of the simultaneously discharged coating solutions are formed to be in double layers in the vicinity of the discharge port of the extrusion die coater, that is, before they are transported to a support and in such a state, they are coated in double layers to the support. The double layer coating solutions forming double layers before coating, easily cause cross-linking reaction in the interface of the two solutions as they are transported to the support. And in the vicinity of the discharge port of the extrusion die coater, the two solutions to be discharged are mixed and easily become viscous and thus coating sometimes become troublesome. Therefore, at the time of simultaneous coating as described above, it is preferable to carry out simultaneous triple layer coating by inserting a barrier layer solution (an intermediate layer solution) between the two solutions when the coating solution for the coloring agent accepting layer (the coating solution A) and the mordant solution (the coating solution B) are coated.

The foregoing barrier layer solution can be selected without any particular limitations. For example, an aqueous solution containing a slight amount of water-soluble resin and water can be cited. The foregoing water-soluble resin is used for the purpose of coating property as a thickener and the like and for example, polymers such as cellulose type resin (e.g. hydroxypropylmethyl cellulose, methyl cellulose, hydroxyethylmethyl cellulose, and the like), polyvinyl pyrrolidone, gelatin and the like can be cited.

Incidentally, the foregoing mordant may be added to the barrier layer solution.

After the coloring agent accepting layer is formed on the support, the coloring agent accepting layer can be subjected to calendering treatment by being passed through roll nips under heating and pressurizing conditions using, for example, super calender, gloss calender or the like, to improve the surface smoothness, glossiness, transparency, and the coating film strength. However, the calendering treatment sometimes results in decrease of porosity (that is, the ink absorbency is deteriorated in some cases), so that the conditions should be set so as to suppress the decrease of the porosity.

The roll temperature of the calendering treatment is preferably in a range from 30 to 150° C., more preferably 40 to 100° C.

The linear pressure between rolls of the calendering treatment is preferably in a range from 50 to 400 kg/cm, more preferably from 100 to 200 kg/cm.

The layer thickness of the foregoing coloring agent accepting layer should be determined in relation to the porosity of the layer, since an absorption capacity sufficient to absorb all of droplets is required in the case of ink-jet recording. For example, in the case that the ink amount is 8 nL/mm$^2$ and the porosity is 60%, a film having a layer thickness of about 15 μm or thicker is required.

Taking such a point into consideration, in the case of ink-jet recording, the layer thickness of the coloring agent accepting layer is preferably 10 to 50 μm.

The pore diameter of the coloring agent accepting layer is preferably from 0.005 to 0.025 μm, more preferably from 0.01 to 0.025 μm on the basis of median diameter.

The above-mentioned porosity and pore median diameter can be measured by using a mercury porosity meter (trade name "Pore Sizer 9320-PC2" manufactured by Shimadzu Corporation.).

Further, the coloring agent accepting layer is preferably excellent in transparency. As a standard, the haze value is preferably 30% or lower, more preferably 20% or lower in the case the coloring agent accepting layer is formed on a transparent film support.

The above-mentioned haze value can be measured by using a haze meter (HGM-2DP: manufactured by Suga Test Instrument Co. Ltd.).

The constituent layers (for example, the coloring agent accepting layer, a back layer and the like) of an ink-jet recording sheet according to the invention may contain a polymer fine particle dispersion. The polymer fine particle dispersion is used for the purpose to improve the film physical properties such as dimensional stability, the curling prevention, the adhesion prevention, film cracking prevention and the like. With respect to the polymer fine particle dispersion, there are descriptions in JP-A Nos. 62-245258, 62-1316648, and 62-110066. Incidentally, if polymer fine particle dispersion with a low glass transition temperature (40° C. or lower) is added to the foregoing mordant-containing layer, cracking and curling of the layer can be prevented. Also, if a polymer fine particle dispersion with a high glass transition temperature is added to a back layer, curling can be prevented.

EXAMPLES

Hereinafter, the present invention will be described more in details along with examples, however the invention is not limited to these examples. Additionally, the words "part" and "%" in the examples respectively denote "parts by mass" and "% by mass" unless remarks are given, and the phrase "average molecular weight" and "polymerization degree" respectively denote "mass average molecular weight" and "mass average polymerization degree".

Preparation of Silica Dispersion

Preparation of Silica Dispersion 1

A pre-dispersion with the following composition was treated by KDL-PILOT manufactured by Shinmaru Enterprises Corporation under conditions of 80% filling ratio of beads with 1.5 mm size and 14 m/sec peripheral speed to obtain a silica dispersion 1:

silica fine particles (an average particle diameter of 14 nm) 25.2 parts (specific surface area by BET method: 300 m²/g; QS-30 manufactured by Tokuyama Corp.)

ion-exchanged water 141 parts polydiallyldimethylammonium chloride 1.8 parts (molecular weight of 35,000, sulfate ion concentration of 0.3% by mass)

Preparation of Silica Dispersion 2

The silica dispersion 2 was prepared in the same manner (as the preparation of the silica dispersion 1), except that polydiallyldimethylammonium chloride is replaced with polydiallyldimethylammonium chloride in the same amount having a molecular weight of 66,000 and a sulfate ion concentration of 0.5% by mass.

Preparation of Silica Dispersion 3

The silica dispersion 3 was prepared in the same manner (as the preparation of the silica dispersion 1), except that 1.8 parts of polydiallyldimethylammonium chloride is replaced with 0.98 part of polydiallyldimethylammonium chloride having a molecular weight of 14,000 and a sulfate ion concentration of 0.2% by mass.

Preparation of Silica Dispersion 4

The silica dispersion 4 was prepared in the same manner (as the preparation of the silica dispersion 1), except that polydiallyldimethylammonium chloride is replaced with polydiallyldimethylammonium chloride in the same amount having a molecular weight of 19,000 and a sulfate ion concentration of 1.6% by mass.

The liquid stability of the above-mentioned silica dispersions was evaluated. The results were shown in Table 1.

TABLE 1

| | Molecular weight | Sulfate ion concentration (% by mass) | Liquid stability |
|---|---|---|---|
| 1 | 35000 | 0.3 | Good |
| 2 | 66000 | 0.5 | Becoming viscous with lapse of time |
| 3 | 14000 | 0.2 | Good |
| 4 | 19000 | 1.6 | Highly viscous |
| 5 | 35000 | 1 | Good |

As shown in Table 1, dispersions containing polydiallyldimethylammonium chloride with a molecular weight exceeding 60,000 show viscosity increase with the lapse of time and even if the molecular weight is 60,000 or lower, dispersions with a sulfate ion concentration exceeding 1.5% by mass, the viscosity thereof becomes high.

Production of Ink-Jet Recording Sheet

Production of Support

Wood pulp containing 100 parts of LBKP was beaten by a double disk refiner to the extent that the Canadian freeness becomes 300 ml. 0.5 part of epoxydated behenic acid amide, 1.0 part of anionic polyacrylamide, 0.1 part of polyamide polyamine epichlorohydrin, and 0.5 part of cationic polyacrylamide were added to the pulp all on the basis of absolute dry weight ratio and the mixture was weighed by a Fourdrinier paper machine to manufacture base paper of 170 g/m².

In order to adjust the surface size of the above-mentioned base paper, 0.04% of a fluorescent brightener (Whitex BB, manufactured by Sumitomo Chemical Co., Ltd.) was added to an aqueous solution of 4% polyvinyl alcohol and the foregoing base paper was immersed in the aqueous solution so as to impregnate the paper with 0.5 g/m² of the aqueous solution on the basis of absolute dry weight and dried and then subjected to calendering treatment to obtain base paper with a density adjusted to be 1.05 g/cc.

After the wire face (the back surface) of the obtained base paper was subjected to corona discharge treatment, a high density polyethylene was coated onto the wire face of the base paper to form a resin layer having a mat face and a thickness of 19 μm, by using a melt extruder (hereinafter, the resin layer face is referred to as the back surface). The resin layer in the back surface side was further subjected to corona discharge treatment and after that, a dispersion containing aluminum oxide ("Alumina Sol 100" produced by Nissan Chemical Industries, Ltd.) and silicon dioxide ("Snowed O" produced by Nissan Chemical Industries, Ltd.) as anti-static agents in 1:2 ratio by mass was applied to form a coating with 0.2 g/m² on the basis of dry weight.

Further, after the felt face (the front face) in the side on which no resin layer was formed was subjected to corona discharge treatment, a low density polyethylene having a MFR (melt flow rate) of 3.8 and containing 10% of anatase titanium dioxide, a slight amount of ultramarine, and 0.01% (on the basis of the polyethylene) of a fluorescent brightener was extruded in a thickness of 29 μm by using a melt extruder to form a highly glossy thermoplastic resin layer on the front surface side of the base paper (hereinafter, the glossy face is referred to as "front surface") and obtained a support.

Example 1

Production of Coating Solution A1 for Coloring Agent Accepting Layer

To 62.3 parts of the above-mentioned silica dispersion 1, a solution containing 27.8 parts of 8% polyvinyl alcohol ("PVA 124" produced by Kuraray Co., Ltd., saponification degree 98.5%, polymerization degree 2,400) and 0.4 parts of boric acid was added and stirred at 8,000 rpm for 10 minutes by a dissolver and further a solution containing 1.2 parts of polyoxyethylene lauryl ether ("Emulgen 109 P" produced by Kao Corporation, 10% aqueous solution, HLB 13.6) and 33.4 parts of ion exchanged water was added and further stirred at 2,000 rpm for 10 minutes by a dissolver to obtain a coating solution A for a coloring agent accepting layer.

The weight ratio (PB ratio=(1)/(4)) of the silica fine particles and the water-soluble resin was 4.5 and the pH of the coating solution A for a coloring agent accepting layer was 3.5 and the coating solution was thus acidic.

Composition of Coating Solution A for Coloring Agent Accepting Layer (1) silica dispersion 1 62.3 parts
(2) Polystop 7300 P (produced by Hakuto Co., Ltd.) 0.06 parts
(3) aqueous solution of 8% polyvinyl alcohol (water-soluble resin) 27.8 parts ("PVA 124" produced by Kuraray Co., Ltd., saponification degree 98.5%, polymerization degree 2,400)
(4) boric acid (a cross-linking agent) 0.4 parts
(5) polyoxyethylene lauryl ether (a surfactant) 1.2 parts ("Emulgen 109 P" produced by Kao Corporation, 10% aqueous solution, HLB 13.6)
(6) ion-exchanged water 33.4 parts.

Production of Ink-Jet Recording Sheet

After the front surface of the foregoing support was subjected to corona discharge treatment, the coating solution A for a coloring agent accepting layer obtained as described above was applied in a coating amount of 200 ml/m$^2$ to the front surface of the support using an extrusion die coater (an application step) and dried at 80° C. (wind speed of 3 to 8 m/second) by a hot air drier until the solids content in the coating layer became 20%. The coating layer showed a constant ratio drying speed during the period. Immediately after that, the support was immersed in a mordant solution B 1 with the following composition for 30 seconds to deposit 20 g/m$^2$ of the mordant solution on the coating layer (a step of supplying the mordant solution), and further dried at 80° C. for 10 minutes (a drying step). Accordingly, a sheet (1) for ink-jet recording of the invention having a coloring agent accepting layer with a dried film thickness of 32 μm was produced.

Composition of Mordant Coating Solution B1

(1) boric acid (a cross-linking agent) 0.65 parts
(2) polyallylamine "PAA-10C" 10% aqueous solution (mordant, produced by Nitto Boseki Co., Ltd.) 25 parts
(3) 2-methylpiperazine (produced by Koei Chemical Co., Ltd.) 2.5 parts
(4) ion-exchanged water 59.7 parts
(5) ammonium cloride (surface pH adjuster) 0.8 parts
(6) polyoxyethylene lauryl ether (a surfactant) 10 parts ("Emulgen 109 P" produced by Kao Corporation, 2% aqueous solution, HLB 13.6)
(7) Megafac "F1405" 10% aqueous solution 2.0 parts (fluorine-based surfactant produced by Dainippon Ink and Chemicals, Inc.)

Example 2

A ink-jet recording sheet of Example 2 was produced according to Example 1 while replacing the silica dispersion 1 used in Example 1 with the silica dispersion 3.

Comparative Example 1

An ink-jet recording sheet of Comparative Example 1 was produced according to Example 1 while replacing the coating solution A1 for a coloring agent accepting layer used in Example 1 with a coating solution A2 for a coloring agent accepting layer.

Production of Coating Solution A2 for Coloring Agent Accepting Layer

After (1) gas-phase process silica fine particles, (2) ion-exchanged water, and (3) ammonia water of the following composition were mixed and dispersed at a rotation speed of 10,000 rpm for 20 minutes by using KP-P manufactured by Shinmaru Enterprises Corporation. And a solution containing the following (4) polyvinyl alcohol, (5) polyoxyethylene lauryl ether, and (6) ion-exchanged water was further added to the dispersion and again dispersed at a rotation speed of 10,000 rmp for 20 minutes to obtain a coating solution A2 for a coloring agent accepting layer.

The weight ratio (PB ratio=(1)/(4)) of the silica fine particles and the water-soluble resin was 4.5 and the pH of the coating solution A2 for a coloring agent accepting layer was 3.5 and the coating solution was thus acidic.

Composition of Coating Solution A2 for Coloring Agent Accepting Layer (1) silica dispersion 1 25.2 parts (specific surface area by BET method: 300 m$^2$/g; QS-30 manufactured by Tokuyama Corp.)
(2) ion-exchanged water 141 parts
(3) 1 N ammonia water 9 parts
(4) aqueous solution of 7% polyvinyl alcohol 79.9 parts ("PVA 124" produced by Kuraray Co., Ltd., saponification degree 98.5%, polymerization degree 2,400)
(5) polyoxyethylene lauryl ether (a surfactant) 9.8 parts ("Emulgen 109 P" produced by Kao Corporation, 2% aqueous solution, HLB 13.6).

Comparative Example 2

An ink-jet recording sheet of Comparative Example 2 was produced according to Example 1 while replacing the silica dispersion 1 used in Example 1 with the following silica dispersion 5.

Silica Dispersion 5

(1) silica fine particles 25.2 parts (specific surface area by BET method: 300 m$^2$/g; QS-30 manufactured by Tokuyama Corp.)
(2) ion-exchanged water 136.2 parts
(3) polyamidine 5.6 parts (SC 700 modified, produced by Hymo Corporation, molecular weight 7,000, solids content 30%)

Evaluation Test

The respective sheets for ink-jet recording obtained as described above were subjected to the following evaluation tests. The results of the test are shown in Table 2.

(1) Glossiness

Measurement was carried out using a digital variable angle glossmeter (UG-5D manufactured by Suga Test Instrument Co. Ltd., measurement hole 8 mm) at an incident angle of 60 degree.

(2) Ink Absorbing Speed

Using an ink-jet printer (PM-900C, manufactured Seiko Epson Corp.), solid images of Y (yellow), M (magenta), C (cyane), K (black), B (blue), G (green), and R (red) were printed on the ink-jet recording sheets and immediately after that (after about 10 seconds), a paper was brought into contact with and pushed against the images and occurrence of the transfer of the ink to the paper was evaluated according to the following standards:

Standards

AA: No transfer of ink to the paper was observed at all. That showed a good ink absorbing speed.
CC: Transfer of ink to the paper was partially observed.

(3) Water Resistance

Using the same printer as used in the (2) test, same printing patterns were formed on the ink-jet recording sheets and after left for 3 hours, the sheets were immersed in water for 1 minute and running state of ink was observed with eyes and evaluated as follows:
AA: No dye ran at all.
BB: A portion of dyes ran and color density became low.
CC: Dyes almost completely ran.

(4) Aging Blurring

Using the same printer and ink as those of the (2) test, lattice-like linear patterns (line width of 0.28 mm) composed of alternating lines of magenta ink and black ink were printed on the ink-jet recording sheets and the visual densities were measured by X Rite 310 TR (manufactured by X-Rite Incorporated.). Further, after left for 3 hours after printing, the sheets were kept in a thermostat at 40° C. and relative humidity of 90% for 1 day and then the visual densities were measured again and evaluation was performed on the basis of the density difference (ΔOD). Smaller density difference (ΔOD) indicates more suppressed aging blurring.

(5) Printing Density

Using an ink-jet printer (PM-900C, manufactured Seiko Epson Corp.), solid images of Y (yellow), M (magenta), C (cyane), K (black), B (blue), G (green), and R (red) were printed on the ink-jet recording sheets and the density of K (black) parts was measured by an X Rite thermometer.

TABLE 2

| | Glossiness | Ink absorbency | Water resistance | Bleeding with the lapse of time | Printing density |
|---|---|---|---|---|---|
| Example 1 | 56 | AA | AA | 0.22 | 2.36 |
| Example 2 | 57 | AA | AA | 0.21 | 2.34 |
| Comparative Example 1 | 35 | CC | AA | 0.21 | 1.8 |
| Comparative Example 2 | 42 | AA | AA | 0.35 | 2.06 |

From the foregoing results in Table 2, the ink-jet recording sheets of the invention were found excellent in printing density and glossiness.

Example 3

Preparation of Finely Granulated Silica Dispersion

Preparation of Pre-Dispersion of Silica (1) silica fine particles (average primary particle diameter 7 nm) 1,000 parts (specific surface area by BET method: 300 $m^2$/g; QS-30 manufactured by Tokuyama Corp.)
(2) ion-exchanged water 5,567 parts
(3) polydimethyldiallylammonium chloride 97 parts (molecular weight 9,000, produced by Dai-Ichi Kogyo Seiyaku Co., Ltd.)

Silica fine particles were added to the ion-exchanged water containing the above-mentioned cationic polymer to obtain a solution containing the above-mentioned components.

Next, the foregoing produced solution was kept at room temperature for 15 hours.

Preparation of Finely Granulated Silica Dispersion

The above-mentioned pre-dispersion was finely granulated by using KD-P manufactured by Shinmaru Enterprises Corporation under the conditions of 80% filling ratio of beads with 1.5 mm size and 14 m/sec peripheral speed to obtain a finely granulated silica dispersion. Next, the foregoing finely granulated silica dispersion was left at room temperature for 24 hours.

Preparation of Coating Solution for Coloring Agent Accepting Layer of Ink Jet Recording Sheet To the foregoing finely granulated silica dispersion, a solution containing the following (2) an aqueous polyvinyl alcohol solution, (3) boric acid, (4) polyoxyethylene lauryl ether, and (5) ion-exchanged water was added and stirred at a rotation speed of 10,000 rpm for 20 minutes by a dissolver to obtain a coating solution for a coloring agent accepting layer.

The weight ratio (PB ratio=(1)/(2)) of the silica fine particles to the water-soluble resin was 4.5:1 and the pH of the coating solution for a coloring agent accepting layer was 3.5 and the coating solution was thus acidic.

The viscosity of the coating solution was measured at 60 minutes after production. A B-type viscometer was employed. The results are shown in Table 3.

Composition of Coating Solution for Coloring Agent Accepting Layer (1) finely granulated silica dispersion 62.3 parts
(2) aqueous solution of 8% polyvinyl alcohol 27.8 parts ("PVA 124" produced by Kuraray Co., Ltd., saponification degree 98.5%, polymerization degree 2,400)
(3) boric acid (a cross-linking agent) 0.4 part
(4) polyoxyethylene lauryl ether (a surfactant) 1.2 parts ("Emulgen 109 P" produced by Kao Corporation, 10% aqueous solution, HLB 13.6)
(5) ion-exchanged water 33.4 parts.

Example 4

An particle dispersion was prepared in the same manner as Example 3, except that the pre-dispersion was left for 24 hours after the pre-dispersion instead of 15 hours in Example 3 and leaving treatment of the particle dispersion after granulating is omitted. And a coating solution for a coloring agent accepting layer was prepared in the same manner as Example 3. The results are shown in Table 3.

Example 5

An particle dispersion was prepared in the same manner as Example 3, except that the pre-dispersion was heated at 50° C. for 6 hours after the pre-dispersion instead of left after pre-dispersion, and particle dispersion and a coating solution for a coloring agent accepting layer was prepared in the same manner. The results are shown in Table 3.

Example 6

An particle dispersion was produced in the same manner as Example 3, except that the particle dispersion was heated at 50° C. for 6 hours after the granulating instead of left after granulating and leaving treatment of the pre-dispersion after pre-dispersion is omitted. And particle dispersion and a coating solution for a coloring agent accepting layer was prepared in the same manner as Example 3. The results are shown in Table 3.

Example 7

An particle dispersion was produced in the same manner as Example 3, except that the pre-dispersion was left for 8 hours after the pre-dispersion instead of 15 hours in Example 3 and that the particle dispersion was heated at 50° C. for 6 hours after the granulating instead of left at room temperature for 24 hours after the granulating. And a coating solution for a coloring agent accepting layer was prepared in the same manner as Example 3. The results are shown in Table 3.

Example 8

An particle dispersion was produced in the same manner as Example 3, except that the leaving treatment of the pre-dispersion after pre-dispersion was omitted. And particle dispersion and a coating solution for a coloring agent accepting layer was prepared in the same manner as Example 3. The results are shown in Table 3.

Example 9

An particle dispersion was produced in the same manner as Example 3, except that the pre-dispersion was heated at 50° C. for 3 hours after the pre-dispersion and the particle dispersion was heated at 50° C. for 3 hours after the granulating instead of leaving the pre-dispersion after pre-dispersion and leaving the particle dispersion after granulating. And particle dispersion and a coating solution for a coloring agent accepting layer was prepared in the same manner. The results are shown in Table 3.

Comparative Example 3

An particle dispersion was prepared in the same manner as Example 3, except that leaving treatment of the pre-dispersion after pre-dispersion and leaving treatment of particle dispersion after granulating was not carried out. And a coating solution for a coloring agent accepting layer was prepared in the same manner as Example 3. The results are shown in Table 3.

TABLE 3

|  | Leaving treatment at room temperature (hours) | | Heating treatment (temperature × hours) | | Viscosity of coating solution for coloring agent accepting layer (mpa · s) |
| --- | --- | --- | --- | --- | --- |
|  | After pre-dispersion | After particle dispersion | After pre-dispersion | after particle dispersion | |
| Example 3 | 15 hr | 24 hr | — | — | 93 |
| Example 4 | 24 hr | — | — | — | 97 |
| Example 5 | — | — | 50° C. × 6 hr | — | 82 |
| Example 6 | — | — | — | 50° C. × 6 hr | 82 |
| Example 7 | 8 hr | — | — | 50° C. × 6 hr | 84 |
| Example 8 | — | 24 hr | — | — | 150 |
| Example 9 | — | — | 50° C. × 3 hr | 50° C. × 3 hr | 80 |
| Comparative example 3 | — | — | — | — | 500 |

As shown in Table 3, by carrying out treatment of leaving the dispersion at room temperature and/or heating treatment according to the invention after the pre-dispersion and/or after particle dispersion, in the case a coating solution for a coloring agent accepting layer was prepared by adding a water-soluble resin or the like to the particle dispersion, the coating solution became stable without showing increase of the viscosity. Consequently, the coating solution for a coloring agent accepting layer showed good coating suitability and filtration suitability.

An ink-jet recording sheet according to the invention has a rapid drying property and gives an image having high printing density and glossy feel similar to silver salt photograph when printed with an ink-jet printer.

An particle dispersion according to the invention does not become highly viscous even if being mixed with a water-soluble resin or the like. Consequently, a coating solution for a coloring agent accepting layer of an ink-jet recording sheet obtained by adding a water-soluble resin or the like to the particle dispersion according to the invention has good coating suitability and filtration suitability.

What is claimed is:

1. A coating solution for a coloring agent accepting layer of an ink-jet recording sheet, wherein the coating solution is obtained by mixing a water-soluble resin with a particle dispersion, which is obtained by further granulating a pre-dispersion obtained by pre-dispersing a solution containing at least fine particles and a cationic polymer, and the pre-dispersion is left at room temperature for 5 hours or more after pre-dispersion and granulating.

2. A coating solution for a coloring agent accepting layer of an ink-jet recording sheet, wherein the coating solution is obtained by mixing a water-soluble resin with the particle dispersion which is obtained by further granulating a pre-dispersion obtained by pre-dispersing a solution containing at least fine particles and a cationic polymer, and the pre-dispersion is heated at a temperature higher than room temperature after pre-dispersion and before granulating.

3. A coating solution for a coloring agent accepting layer of an ink-jet recording sheet according to claim 1, wherein the coating solution further contains a cross-linking agent capable of cross-linking the water-soluble resin.

4. A coating solution for a coloring agent accepting layer of an ink-jet recording sheet according to claim 2, wherein the coating solution further contains a cross-linking agent capable of cross-linking the water-soluble resin.

5. A coating solution for a coloring agent accepting layer of an ink-jet recording sheet according to claim 3, wherein the cross-linking agent is boric acid or a boron compound.

6. A coating solution for a coloring agent accepting layer of an ink-jet recording sheet according to claim 4, wherein the cross-linking agent is boric acid or a boron compound.

7. A coating solution for a coloring agent accepting layer of an ink-jet recording sheet according to claim 1, wherein the cationic polymer is polydiallyldialkyl cationic polymer.

8. A coating solution for a coloring agent accepting layer of an ink-jet recording sheet according to claim 2, wherein the cationic polymer is polydiallyldialkyl cationic polymer.

* * * * *